No. 794,568.

Patented July 11, 1905.

UNITED STATES PATENT OFFICE.

ALFRED THAUSS, OF ELBERFELD, GERMANY, ASSIGNOR TO FARBENFABRIKEN OF ELBERFELD CO., OF NEW YORK, N. Y., A CORPORATION OF NEW YORK.

NEW AZO DYE.

SPECIFICATION forming part of Letters Patent No. 794,568, dated July 11, 1905.

Application filed March 28, 1905. Serial No. 252,514.

*To all whom it may concern:*

Be it known that I, ALFRED THAUSS, doctor of philosophy, chemist, (assignor to the FARBENFABRIKEN OF ELBERFELD Co., of New York,) residing at Elberfeld, Germany, have invented a new and useful Improvement in New Azo Dyes; and I hereby declare the following to be a clear and exact description of my invention.

I have found that new and valuable azo dyestuffs can be obtained by first combining diazo compounds with the thiazol-sulfonic acid having the following formula:

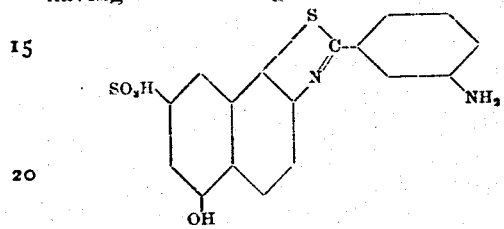

which I name "meta-amidobenzenylthio-2-5-amidonaphthol-7-sulfonic acid," and then isolating from the reaction mass the resulting dyestuffs.

The above-mentioned thiazol-sulfonic acid can be produced by heating with alkaline polysulfids the meta-nitro-benzylidene-2-5-amidonaphthol-7-sulfonic acid— that is to say, the condensation product of meta-nitrobenzaldehyde with 2-5-amidonaphthol-7-sulfonic acid.

The new dyestuffs produced in the above-defined manner are in the shape of their alkaline salts from brownish red to brown powders soluble in water with a red color and being dissolved by concentrated sulfuric acid with from a red to violet color. They dye unmordanted cotton from yellowish-red to bluish-red shades. When on fiber, these dyestuffs can be further diazotized and coupled with beta-naphthol, yellower and more deepened shades fast to washing being thus obtained.

In carrying out my new process practically I can proceed as follows, the parts being by weight: 15.1 parts of meta-nitrobenzaldehyde are added to a solution of twenty-six parts of 2-5-amidonaphthol-7-sulfonate of sodium in two hundred parts of hot water. The aldehyde enters quickly into solution with the production of the benzylidene compound. After the addition of a concentrated solution of thirty parts of sulfur and seventy-five parts of crystallized sodium sulfid in water it is heated to boiling for twenty-four hours at a reflux condenser. With disengagement of hydrogen sulfid the thiazol nucleus is formed, the nitro group being reduced at the same time. The solution thus obtained is then filtered in order to remove therefrom the precipitated sulfur and acidulated by the addition of sulfuric acid in order to precipitate the new compound. The acid thus separated in the shape of faint-yellow crystals is soluble with difficulty in water. It is converted into its sodium salt, which is easily soluble in hot water by means of sodium carbonate, and then freed from admixed sulfur by redissolving it from hot water. 37.2 parts of this product are then dissolved in water with the addition of 15.6 parts of sodium carbonate and to the resulting solution the diazo derivative produced in the usual manner from 10.7 parts of orthotoluidin is added. The dyestuff thus formed is precipitated by the addition of common salt, filtered off, and dried.

The new dyestuff is after being dried and pulverized a reddish-brown powder, being soluble in water and in concentrated sulfuric acid (of 66° Réaumur) with a red color. It dyes unmordanted cotton red shades. When on fiber, the coloring-matter can be further diazotized and developed by means of beta-naphthol, red shades of a yellower tint being thus produced, which are fast to washing.

The process for obtaining the above-named dyestuffs proceeds in an analogous manner on using other diazo compounds, such as the diazo derivatives of anilin, xylidin, orthoanisidin, or the like.

Having now described my invention and in what manner the same is to be performed, what I claim is—

1. The herein-described new azo dyestuffs obtainable by combining diazo compounds with the meta-amidobenzenylthio-2-5-amidonaphthol-7-sulfonic acid having the above-given formula, which dyestuffs are in the shape of their alkaline salts from brownish-red to brown powders soluble in water with a red and in concentrated sulfuric acid with from a red to violet color; dyeing unmordanted cotton from yellowish-red to bluish-red shades; being capable, when on fiber, to be further diazotized and coupled with beta-naphthol, yellower and more deepened shades being thus obtained, which are fast to washing, substantially as hereinbefore described.

2. The herein-described new azo dyestuff obtainable by combining diazotized ortho-toluidin with the meta-amidobenzenylthio-2-5-amidonaphthol-7-sulfonic acid having the above-given formula, which dyestuff is in the shape of its sodium salt a reddish-brown powder soluble in water and in concentrated sulfuric acid with a red color; dyeing unmordanted cotton red shades which can be further diazotized and developed on the fiber by means of beta-naphthol, red shades of a yellower tint being thus obtained which are fast to washing, substantially as hereinbefore described.

In testimony whereof I have signed my name in the presence of two subscribing witnesses.

ALFRED THAUSS.

Witnesses:
OTTO KÖNIG,
J. A. RITTERSHAUS.